United States Patent [19]

Bennett, Jr. et al.

[11] 4,024,107

[45] May 17, 1977

[54] METHOD OF SEPARATING A COPPER-AMINE CATALYST FROM A POLYPHENYLENE ETHER REACTION MIXTURE

[75] Inventors: James Gordy Bennett, Jr.; Glenn Dale Cooper, both of Delmar, N.Y.

[73] Assignee: General Electric Company, Pittsfield, Mass.

[22] Filed: May 12, 1975

[21] Appl. No.: 576,677

[52] U.S. Cl. .......................................... 260/47 ET
[51] Int. Cl.² ................. C08G 65/44; C08G 65/46
[58] Field of Search ............................... 260/47 ET

[56] References Cited

UNITED STATES PATENTS

| | | | |
|---|---|---|---|
| 3,234,183 | 2/1966 | Hay | 260/47 |
| 3,783,147 | 1/1974 | Calicchia et al. | 260/47 ET |

Primary Examiner—Lester L. Lee
Attorney, Agent, or Firm—William F. Mufatti; Edward A. Hedman

[57] ABSTRACT

A novel method of separating a copper-amine catalyst from a polyphenylene ether reaction mixture is disclosed which is based on the use of 2,2'-dipyridyl to form an insoluble complex which may be readily separated from the reaction mixture.

9 Claims, No Drawings

METHOD OF SEPARATING A COPPER-AMINE CATALYST FROM A POLYPHENYLENE ETHER REACTION MIXTURE

This invention provides a novel approach to the problem of separating a copper-amine catalyst from a polyphenylene ether reaction mixture. The invention is based on the use of 2,2'-dipyridyl to form an insoluble complex with the copper-amine catalyst which may be readily separated from the reaction solution.

BACKGROUND OF THE INVENTION

The polyphenylene ethers and processes for their preparation are known in the art and described in numerous publications, including Hay, U.S. Pat. Nos. 3,306,874 and 3,306,875 or Spousta, U.S. Pat. No. 3,549,670. Other procedures are described in the Bennett and Cooper patents, U.S. Pat. Nos. 3,639,656, 3,642,699, 3,733,299 and 3,661,848. All of these patents are incorporated herein by reference.

The processes most generally used to produce the polyphenylene ethers are based on the self-condensation of a monovalent phenol in the presence of an oxygen-containing gas and a copper-amine catalyst.

In the prior art, various extraction techniques have been proposed which use many different reagents that form complexes with the copper-amine catalyst. For the most part, the complexes of the prior art extraction methods have been completely or partially soluble in the reaction solution. Therefore, the efficiency of these extraction type separations is always dependent on the solvent partition ratio and necessitates the use of large volumes of liquid for liquid-liquid extraction of the reaction solution. These increase the cost of the operation by reason of the problems associated with the handling, storage and purification of large volumes of liquids. In view of this, it is apparent that it would be desirable to have a catalyst separation process that eliminates the need to employ large quantities of liquid in various prior art types of liquid-liquid extraction processes.

Polyethylene ether reaction solutions contain polymer, catalyst, an organic solvent and some water formed in the reaction. This system inherently poses problems if one seeks to insolubilize the catalyst as many materials that are insoluble in organic liquids are soluble in water.

Applicants have discovered that when 2,2'-dipyridyl is added to a polyphenylene ether reaction solution that contains a copper-amine catalyst, a complex is formed that is insoluble in the organic reaction solvent and in water. This permits the subsequent separation of the complexed catalyst without the use of any liquid-liquid extraction technique.

Accordingly, it is a primary object of this invention to provide a method of separating a copper-amine catalyst from a polyphenylene ether reaction mixture that does not require liquid-liquid extraction of the catalyst.

It is also an object of this invention to provide a method of making the copper-amine catalyst of a polyphenylene ether reaction mixture insoluble in both the organic and aqueous phases of said reaction mixture.

DETAILED DESCRIPTION OF THE INVENTION

This invention provides in a process for forming a polyphenylene ether by an oxidative coupling reaction in the presence of a complex copper-amine catalyst, which comprises passing an oxygen-containing gas through a reaction solution of a phenol and said catalyst, the improvement which comprises separating said catalyst by adding an amount of 2,2'-dipyridyl to said reaction solution which is sufficient to form an insoluble complex with said copper-amine catalyst and thereafter separating said insoluble complex from said reaction solution.

The preferred polyphenylene ether resins are of the formula

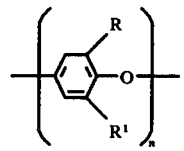

wherein the oxygen ether atom of one unit is connected to the benzene nucleus of the next adjoining unit, $n$ is an integer of at least 50; and R and $R^1$ are monovalent substituents selected from hydrogen, halogen, hydrocarbon radicals, halo-hydrocarbon radicals having at least two carbon atoms between the halogen atom and the phenyl nucleus, hydrocarbonoxy and halohydrocarbonoxy radicals having at least two carbon atoms between the halogen atom and the phenyl nucleus.

The preferred polyphenylene resin is poly(2,6-dimethyl-1,4-phenylene ether).

The compound 2,2'-dipyridyl is described in the literature and is commercially available.

In carrying out the process of the invention, dry solid 2,2'-dipyridyl may be added directly to polyphenylene ether reaction mixture. Thereafter, the mixture is agitated to form the insoluble copper complex. If desired, the 2,2'-dipyridyl may be added as a dispersion or solution in any solvent that is compatible with the organic phase of the polyphenylene ether reaction mixture. Suitable solvents include toluene, chloroform and others that are listed in the above-noted Hay patents.

Generally, a slight stoichiometric excess of 2,2'-dipyridyl to the amount of copper in the reaction mixture will be employed in the practice of the invention. Practical amounts of 2,2'-dipyridyl that may be used are within the mole ratios of 1.1:1 to 5:1 of 2,2'-dipyridyl to the amount of copper that is to be complexed.

The complexed, insoluble catalyst may be separated from the reaction solution by filtration or by centrifugation according to conventional techniques. Conventional filtering aids such as diatomaceous earth, silica or glass wool may be employed to trap the insolubilized catalyst. The nature of the filtering aid is not critical and any suitable material may be used. Centrifugation may be employed to resolve the solid insoluble catalyst phase from the liquid phase containing the polymer solution.

After the catalyst free polymer solution is obtained, the polyphenylene ether resin may be isolated from the solution by the use of an antisolvent such as methanol or by other known techniques such as crumbing, spray drying, steam precipitation, etc.

DESCRIPTION OF THE PREFERRED EMBODIMENTS

EXAMPLE 1

A reactor was charged at 21% solids with 2,6-xylenol, cupric bromide, dibutyl amine and benzene. The catalyst ratio of 2,6-xylenol: cupric bromide; di-n-butyl amine was 400:1:45. Oxygen was introduced and after 2 hours the reaction mixture was removed from the reactor and diluted with an equal volume of benzene. A portion of the reaction mixture was contacted with 2,2'-dipyridyl at a molar ratio of 2:1 of 2,2'-dipyridyl to the calculated amount of copper in the portion of the reaction solution. The 2,2'-dipyridyl formed a copper complex that was insoluble in both the aqueous (water from the oxidation reaction) and the organic phases that was filtered off with diatomaceous earth as a filter aid.

The filtered reaction mixture was slowly added through a separatory funnel to 1500 ml of water vigorously stirred and heated almost to boiling in a 5-liter creased round bottomed flask. The polymer was separated in the form of a friable crumb, washed with water, and dried under vacuum to give a 90% yield of resin.

A portion of the same reaction mixture was treated with 50% acetic acid and the polymer was isolated by using methanol as an antisolvent. Both samples of polymer were assayed for copper residue and the results were as follows:

|  | Cu in Polymer |
|---|---|
| 2,2'-dipyridyl | 30 ppm |
| acetic acid* | 28 ppm |

*control

EXAMPLE 2

To a tube reaction vessel equipped with a Vibro mixer stirrer and oxygen inlet were added 0.144 g of cuprous bromide, 1.68 ml of di-n-butyl amine and 140 ml of toluene. The mixture was stirred for 5 minutes, after which 10.0 g of 2,6-xylenol were added. Oxygen was passed through the stirred reaction mixture while maintaining the temperature at 25° C. After 30 minutes 0.156 g of 2,2'-dipyridyl was added with the appearance of a precipitate on the walls of the reaction vessel. The solution viscosity did not increase after the addition of the 2,2'-dipyridyl. Thereafter, the reaction mixture was poured from the vessel and one portion precipitated with methanol, with a second portion being centrifuged prior to the precipitation. The polymer was slurried in methanol and dried with the following results:

|  | Color | Cu |
|---|---|---|
| Direct precipitation | 1.6 | 14 ppm |
| Centrifugation prior to precipitation | 1.3 | 10 ppm |

A second polymerization was carried out in a similar manner but the dipyridyl was added after 120 minutes of reaction time. The reaction mixture was filtered through glass wool and precipitated with methanol. The dried polymer analyzed as shown below:

| intrinsic viscosity | 0.48 dl/g* |
|---|---|
| color | 0.6 |
| copper (ppm) | 14 |
| nitrogen (%) | 0.087 |

*in chloroform at 30° C.

Obviously, other modifications and variations of the present invention are possible in the light of the above teachings. It is, therefore, to be understood that changes may be made in the particular embodiments of the invention described which are within the full intended scope of the invention as defined by the appended claims.

We claim:

1. In a process for forming a polyphenylene ether by an oxidative coupling reaction in the presence of a complex copper-amine catalyst comprising passing an oxygen-containing gas through a reaction solution of a phenol and said catalyst, the improvement which comprises separating said catalyst by adding an amount of 2,2'-dipyridyl to said reaction solution which is sufficient to form an insoluble complex with said copper-amine complex and thereafter separating by filtration or centrifugation said insoluble complex from said reaction solution.

2. A process as defined in claim 1 wherein said polyphenylene ether is selected from the formula:

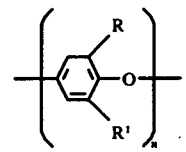

wherein the oxygen ether atom of one unit is connected to the benzene nucleus of the next adjoining unit, $n$ is an integer of at least 50; and R and $R^1$ are monovalent substituents selected from hydrogen, halogen, hydrocarbon radicals, halohydrocarbon radicals having at least two carbon atoms between the halogen atom and the phenyl nucleus, hydrocarbonoxy and halohydrocarbonoxy radicals having at least two carbon atoms between the halogen atom and the phenyl nucleus.

3. A process as defined in claim 2 wherein said polyphenylene ether is poly(2,6-dimethyl-1,4-phenylene ether).

4. A process as defined in claim 1 wherein a ratio of from 1.1:1 to 5:1 of 2,2'-dipyridyl to the copper in the reaction solution.

5. A process as defined in claim 1 wherein the insoluble complex is separated from the reaction solution by filtration.

6. A process as defined in claim 1 wherein the insoluble complex is separated from the reaction solution by centrifugation.

7. A process as defined in claim 1 wherein the 2,2'-dipyridyl is added to the reaction solution in the form of a solution in a solvent which is compatible with the reaction solution.

8. A process as defined in claim 1 wherein the 2,2'-dipyridyl is added to the reaction solution as a dry solid.

9. In a process for forming a polyphenylene ether by an oxidative coupling reaction in the presence of a copper-amine catalyst comprising passing an oxygen-containing gas through a reaction solution containing 2,6-xylenol and said catalyst, the improvement which comprises contacting the reaction solution with an amount of 2,2'-dipyridyl that is within the mole ratio of 1.1:1 to 5:1 to 2,2'-dipyridyl to copper, to form a insoluble complex with said copper-amine catalyst and thereafter filtering said reaction solution to obtain a solution of poly(2,6-dimethyl-1,4-phenylene ether) that is substantially free of catalyst.

* * * * *